United States Patent

Tilly et al.

[15] 3,637,955

[45] Jan. 25, 1972

[54] SUPERVISORY SYSTEM FOR UNATTENDED REPEATERS

[72] Inventors: John Frederick Tilly; Ian Johnson Hirst, both of Kent, England

[73] Assignee: International Standard Electric Corporation, New York, N.Y.

[22] Filed: Dec. 29, 1969

[21] Appl. No.: 888,360

[30] Foreign Application Priority Data

Jan. 2, 1969 Great Britain ........................... 219/69

[52] U.S. Cl. ..................................................... 179/175.31R

[51] Int. Cl. ......................................................... H04b 3/46

[58] Field of Search ............................................ 179/175.31

[56] References Cited

UNITED STATES PATENTS 3,189,694 6/1965 Frankton .......................... 179/175.31

3,059,068 10/1962 Frankton et al. ................. 179/175.31

3,325,605 6/1967 Brewer ............................. 179/175.31

*Primary Examiner*—Kathleen H. Claffy

*Assistant Examiner*—Douglas W. Olms

*Attorney*—C. Cornell Remsen, Jr., Walter J. Baum, Percy P. Lantzy, J. Warren Whitesel, Delbert P. Warner and James B. Raden

[57] ABSTRACT

A supervisory system for intermediate repeaters enables the gain of a repeater to be determined from either terminal station, and the noise produced by a repeater to be measured from one station without interrupting service. To test for gain, terminal station A(B) transmits a test signal lying in a 1st(2nd) frequency band not used for traffic. At the repeater this signal is converted by a modulator into a signal lying in a 2nd(1st) frequency band, this signal being returned to the A(B) terminal. The repeaters are identified by the frequency of a crystal filter included in the path of the test signals. The circuit can be used with single or double amplifier repeaters.

4 Claims, 3 Drawing Figures

Inventors
J. F.Tilly-I.J.Hirst
By [signature]
Attorney

SUPERVISORY SYSTEM FOR UNATTENDED REPEATERS

The present invention relates to a supervisory system for intermediate repeaters in a two way, two wire telecommunication carrier current system.

Many circuit arrangements for the supervision of intermediate repeaters in telecommunication systems are known which enable to determine the location of a faulty repeater by gain measurements from one of the terminal stations. Systems have also been disclosed which enable the gain of a repeater to be determined from either terminal station, but for this purpose the system must be taken out of service.

According to the invention there is provided a system for supervising intermediate repeaters in a two way, two wire telecommunication carrier current system extending between terminal station "A" transmitting traffic signals lying in an upper frequency band to terminal station "B" and receiving from its traffic signals lying in a lower frequency band, said bands being spaced from each other by a crossover band of frequencies not used for traffic, comprising means to measure the gain of a repeater from either terminal station and means to measure the noise generated by a repeater from terminal station "A," said measurements being carried out by means of signals having frequencies lying below the lowest frequency band and by frequencies lying in the crossover band during normal operation of the system without interfering with traffic signals.

The invention will now be described with reference to the accompanying drawings in which.

Figure 1:
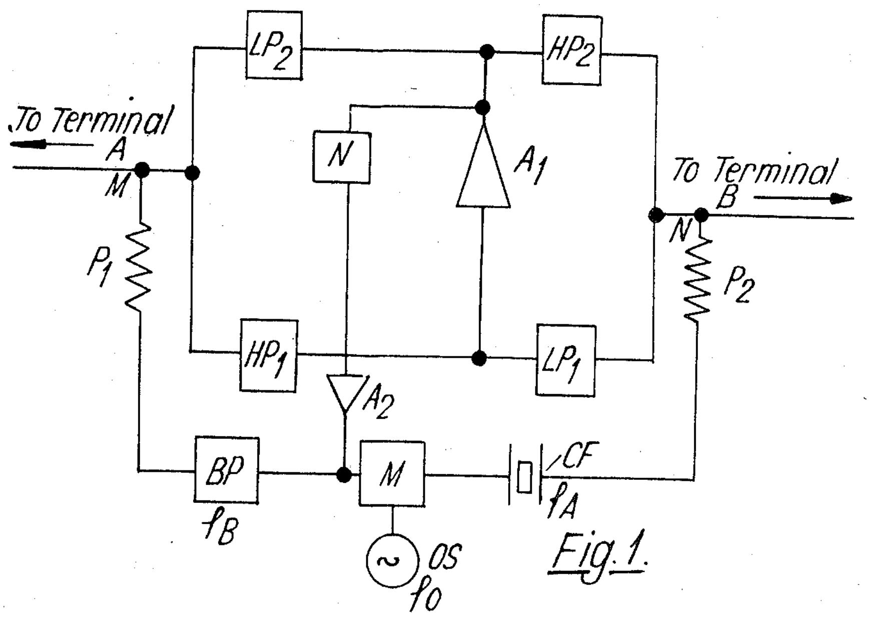
FIG. 1 shows in block schematic form a supervisory circuit for a repeater according to an embodiment of the invention.

FIG. 1 shows one of the intermediate repeaters of a telecommunication system interconnecting terminal stations "A" and "B," not shown. The repeater shown is of conventional design and comprises a single amplifier $A_1$ connected between directional filters including low-pass filters $LP_1$, $LP_2$ and high-pass filters $HP_1$, $HP_2$. In this arrangement traffic signals which are transmitted from terminal A to terminal B lie in an upper band of frequencies, and signals transmitted in the opposite direction lie in a lower band of frequencies.

The supervisory circuit which enables the gain of the repeater to be measured either from terminal station A or B comprises a band-pass filter BP, a modulator M and a narrow band crystal filter CF. The modulator is supplied with a carrier wave by oscillator OS.

The supervisory path is connected across the repeater inputs M and N via pads $P_1$ and $P_2$, which prevent the main transmission path from being affected in the event of a fault in the supervisory equipment.

Figure 2:
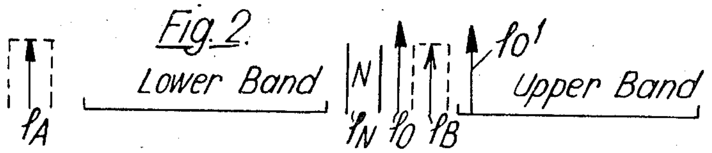
FIG. 2 shows a frequency plan found useful in explaining the invention.

The operation of the gain measuring circuit will now be explained with reference to the frequency allocation shown in FIG. 2.

It will first be assumed that the gain information is required at station A. Station A transmits a signal of frequency $1B$ which lies below the upper frequency band and is passed by the band-pass filter to the modulator M. The modulation is provided with a locally generated carrier of frequency $1o$. This carrier may lie either in the crossover band or in the upper band used for traffic. In the frequency allocation plan $1o$ is shown within the crossover band. In this particular case $1B>1o$ and the lower sideband $1A=1B-1o$, which lies below the lower band, is transmitted by the crystal filter CF and is returned to terminal station A via the low-pass sections of the directional filter. The frequency $1A$ is individual to each repeater. If the carrier frequency lies in the upper band of frequencies used for traffic, as indicated in FIG. 2 by $1o'$, the lower sideband $1A=1o-$If it is required to measure the gain of the repeater from terminal station B, this station transmits a signal of frequency $1A$ which is characteristic of the repeater in question. This signal is passed by the crystal filter at the repeater to the modulator where it is converted into a frequency $1B$ equal either to $(1A+1o)$ or to $(1o'-1A)$ depending on the position of the carrier wave.

The supervisory system can be extended to provide at one of the terminal stations information on the noise performance of each repeater. For this purpose a noise filter N is connected to the output of the amplifier $A_1$ at each repeater and passes a band of noise indicated by $1N$ in FIG. 2. This band of noise is amplified by amplifier $A_2$ and its output connected to modulator M. In the modulator the noise band $1N$ is translated into noiseband $1o-1N=1A$. A component of this noise coinciding with the passband of crystal filter CF is passed by the latter and is returned to terminal station A via the low-pass sections of the directional filter. As the passband of the crystal filter is characteristic of each repeater, a narrow band of noise will be received at terminal station A for each repeater, each desired band being selected at the terminal by means of a selective receiver.

Figure 3:
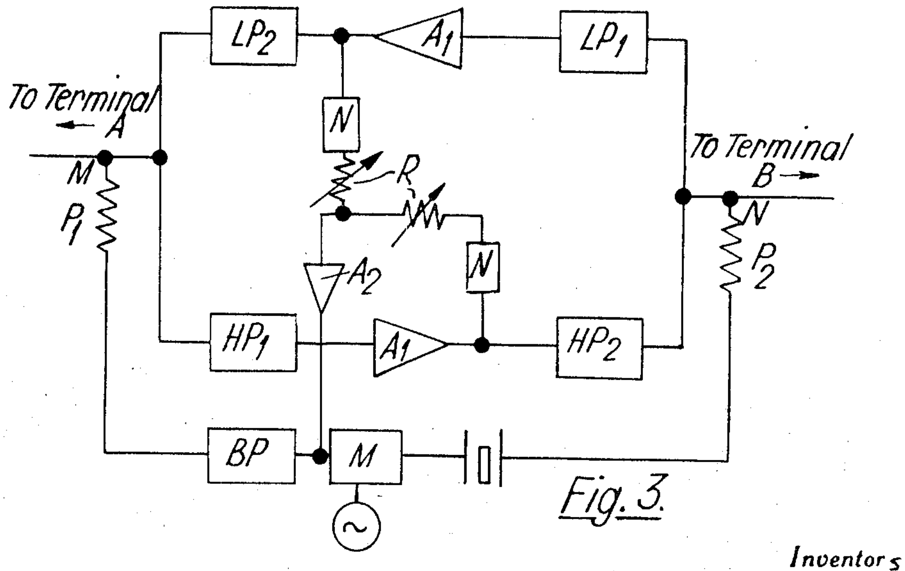
FIG. 3 shows in schematic form a further embodiment of the invention.

FIG. 3 shows a modification of the supervisory circuit required if the repeater uses a separate amplifier for each direction of transmission. In this case two noise filters N are used, one for each amplifier, the outputs of the two filters being combined by means of adjusting resistors R, so that a single indication of the repeater noise is given.

It will be appreciated that as the measurement of repeater noise does not require the transmission from a terminal station of a test signal the signals representative of the noise generated by each repeater are being continuously received at the terminal station. Therefore when gain of a particular repeater is measured the gain signal and the noise signal will be superimposed. The information carried by the gain signal can be extracted by arranging that the "gain" signals are of a substantially higher level than the "noise" signals so that the latter are neglected or by using a RMS reading detector and correcting the combined signal for the noise component.

It is to be understood that the foregoing description of specific examples of this invention is made by way of example only and is not to be considered as a limitation on its scope.

We claim:

1. A system for supervising intermediate repeaters in a two way, two wire telecommunication carrier current system extending between a terminal station "A" transmitting traffic signals lying in an upper frequency band to a terminal station "B" and receiving traffic signals lying in a lower frequency band from terminal station "B," said bands being spaced from each other by a crossover band of frequencies not used for traffic, comprising means to measure the gain of a repeater from either terminal station and means to measure the noise generated by a repeater from terminal station "A," said measurements being carried out by means of signals having frequencies lying below the lowest frequency band and by frequencies lying in the crossover band during normal operation of the system without interfering with traffic signals, each repeater including a test path having a band-pass filter, a modulator and a crystal filter connecting in series with each other, the band-pass filter and the crystal filter having their free terminals connected to the opposite terminals of the repeater, wherein the modulator is supplied with a carrier wave of frequency $1o$, and wherein the crystal filter passes frequency $1A$ which is exclusive to each repeater and which lies below the lower frequency band, the frequencies $1o$ and $1A$ being so chosen that the frequency $1o+1A=1B$ lies within the crossover band of frequencies.

2. A system as claimed in claim 1 wherein each repeater is provided with separate amplifiers for each direction of transmission.

3. A system as claimed in claim 1 including directional filters having high-pass and low-pass sections, the gain of a repeater being measured either from terminal station A by transmitting from it test signal $1B$ lying within the passband of the band-pass filter, which signal is converted in a modulator into a signal of frequency $1A=1B-1o$ or $1A=1o-1B$ which is returned to terminal station A via the crystal filter and the low-pass sections of the directional filters of the repeater, or from terminal station B by transmitting from it a signal of frequency *1A* which is passed by the crystal filter, is converted in the modulator into a signal of frequency *1B*=10+1A which is returned to the B station via the band-pass filter and the high-pass sections of the directional filter.

4. A system as claimed in claim 1 wherein for the measurement of noise generated by a repeater amplifier a band of noise lying in the crossover band is extracted by means of a noise filter from the amplifier output, is converted in the modulator into a band of frequencies, a component of which is passed by the crystal filter and is returned to the A terminal via the low-pass sections of the directional filter.

* * * * *